United States Patent [19]

Scarpone

[11] Patent Number: 4,742,743
[45] Date of Patent: May 10, 1988

[54] RADIAL SAW ACCESSORY FOR PREVENTING SAWDUST BUILDUP

[76] Inventor: William J. Scarpone, 11648 Orange Grove Blvd., Royal Palm Beach, Fla. 33411

[21] Appl. No.: 855,833

[22] Filed: Apr. 24, 1986

[51] Int. Cl.$^4$ .................. B27B 5/20; B27G 3/00; B23D 47/00
[52] U.S. Cl. .................. 83/104; 83/471.2; 144/252 R
[58] Field of Search .............. 83/100, 104, 109, 471.2, 83/477.2; 144/252 R, 252 A; 269/900

[56] References Cited

U.S. PATENT DOCUMENTS

| | | | |
|---|---|---|---|
| 978,487 | 12/1910 | Reed | 83/104 |
| 2,680,458 | 6/1954 | Grammer | 269/265 |
| 2,839,102 | 6/1958 | Kido | 83/100 |
| 3,139,124 | 6/1964 | Hoff | 83/486.1 |
| 3,333,611 | 8/1967 | Paul | 144/252 R |
| 4,205,835 | 6/1980 | Gerber | 269/289 R |
| 4,255,995 | 3/1981 | Connor | 83/100 |
| 4,494,433 | 1/1985 | Gerber | 83/374 |
| 4,497,477 | 2/1985 | Abel | 269/900 |
| 4,526,129 | 7/1985 | Braden | 269/900 |

OTHER PUBLICATIONS

"Power and Hand Tools", Sears Specialog, 1985/86, pp. 38-41.
"Power Tool Knowhow Saves You Money", (Radial Saw Edition), Sears, 1985, pp. 1, 6-8, Chapter 1.

*Primary Examiner*—E. R. Kazenske
*Assistant Examiner*—Hien H. Phan
*Attorney, Agent, or Firm*—Jerry A. Miller

[57] ABSTRACT

An accessory for use in conjunction with a radial saw for preventing buildup of sawdust on a main table adjacent a fence of said radial saw, the accessory table includes a table member having an upper and a lower surface. The table member comprising a grid structure having a plurality of apertures allowing communication from the upper to the lower surface. The apertures are situated between an array of rigid supporting beam-like members. The apertures are adequately large to permit easy passage of sawdust therethrough and the supporting members make up a very small portion of the upper surface of the table member so that accumulation of sawdust on the upper surface is minimized. Preferably, the supporting members are tapered near the upper surface so that upper surface area is minimized. The supporting members are made of plastic or other readily sawable material.

11 Claims, 2 Drawing Sheets

RADIAL SAW ACCESSORY FOR PREVENTING SAWDUST BUILDUP

BACKGROUND OF THE INVENTION

1. FIELD OF THE INVENTION

This invention relates generally to the field of radial arm saws and radial saw accessories. More particularly, this invention relates to a passive sawdust removal apparatus for preventing the buildup of sawdust at the fence of a radial saw. The device requires no vacuum source to operate.

2. BACKGROUND

The radial arm saw is a popular tool for woodworking which provides many known advantages to the user including relative ease in making properly aligned precision straight cuts. Unfortunately, it also has the problem that the direction and nature of the blade's rotation causes sawdust to build up adjacent the fence used to position wood for such precision cuts. The radial arm saw is especially prone to such sawdust buildup due to the position of the blade above the table. When performing precision wood crafting, even a small buildup of sawdust along the fence can have a major impact upon the appearance, fit and value of the finished product. Also, with the ever increasing cost and decreasing supply of fine woods, erronous cuts can prove quite costly.

Several attempts have been made at minimizing sawdust buildup in power tools such as the radial saw and table saw. For example, U.S. Pat. No. 4,255,995 to Connor shows a lower cover for a table saw which surrounds the lower part of the saw blade. The cover is coupled to a vacuum cleaner to pull sawdust away from the table. Similar devices may also be available for radial saws to pull sawdust from the blade area.

While such devices are relatively effective and provide significant improvement over saws which are not so equipped, it is virtually impossible to vacuum all such debris away from the saw blade and off the table automatically due to the high speed rotation of the blade. Since even very small amounts of such debris can result in expensive cutting errors, such vacuum accessories are not wholly acceptable. Also, such vacuum powered accessories are relatively expensive and may consume significant amounts of electricity. These disadvantages are significantly alleviated by use of the present invention.

SUMMARY OF THE INVENTION

Accordingly, it is an object of the present invention to provide an improved apparatus for preventing sawdust from accumulating adjacent the fence of a radial saw.

It is another object of the present invention to provide an inexpensive device for preventing sawdust buildup adjacent the fence of a radial saw.

It is another object of the present invention to provide an accessory table for allowing sawdust to drop harmlessly away from the fence of a radial arm saw.

It is another object of the present invention to provide an apparatus which passively removes sawdust from a radial saw's table near the fence without requiring additional power consumption.

In one embodiment of the present invention an improved accessory table for use in conjunction with a radial saw prevents buildup of sawdust on a main table adjacent a fence of the radial saw. The accessory table includes a table member having an upper and a lower surface. The table member includes a grid structure having a plurality of apertures allowing communication from upper to lower surface. The apertures are situated between an array of rigid supporting members. The apertures are adequately large to permit easy passage of sawdust therethrough and the supporting members make up a very small portion of the upper surface of the table member so that accumulation of sawdust on the upper surface is minimized.

These and other objects, features, and advantages of the invention will become apparent to those skilled in the art upon consideration of the following detailed description taken in conjunction with the accompanying drawings.

DETAILED DESCRIPTION OF THE INVENTION

Figure 1:
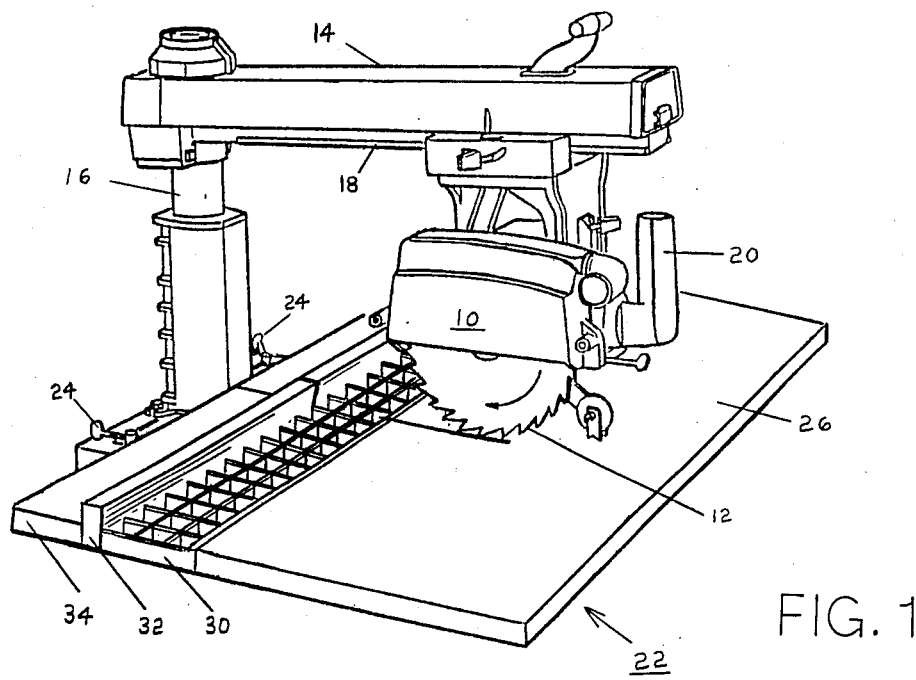
FIG. 1 is a view of the present invention installed in the table area of a radial arm saw.

Turning now to the drawings wherein like reference numerals designate identical or corresponding parts throughout the several views, and more particularly to FIG. 1 thereof, a perspective view of the present invention is shown installed on a radial arm saw such as the Sears Craftsman (TM) Model No. 113.19770 radial saw. Such radial arm saws typically include a circular saw portion 10 including a circular saw blade 12 which is slidably suspended from an arm 14 which is pivotally attached to a tube-like shaft 16. The saw's arm 14 may be radially adjusted about shaft 16 and raised and lowered to achieve various types of cuts as will be appreciated by those skilled in the art.

Circular saw portion 10 is attached to arm 14 in a manner which permits it to slide toward and away from shaft 16 along a set of tracks 18 or similar structures. Circular saw portion also typically includes a handle 20 to facilitate ease of sliding the blade 12 through a workpiece (not shown) which is resting or clamped on the table designated generally as 22.

Radial saws such as that shown in FIG. 1 generally include a table which is adapted to take on various configurations. This is accomplished by a pair of table clamps 24 which are generally situated near the rear of the table. The table 22 generally includes a fixed portion of the table located farthest from the shaft 16 which is generally referred to as the front or main table 26. Main table 26 is generally rigidly attached to the saw's supporting structure (not shown) which generally includes a base and a set of legs. Table clamps 24 operate by urging various accessory tables toward the main table 26 and locking them into place with a clamping action as is known in the art.

FIG. 1 further shows the present invention, accessory table 30, installed adjacent main table 26 just in front of a rip fence 32 which is installed adjacent a rear table 34. For purposes of this document, the convention that the front of the table or saw is the side adjacent the main table and the rear of the table or saw is adjacent the rear table will be adhered to for ease of explanation. It will be clear to those skilled in the art that various spacers may also be installed to change the configuration of the table as needed to effect various cuts. It should also be noted that for illustrative purposes, accessory table 30 is shown somewhat exaggerated in size in FIG. 1 when compared with the actual dimensions of the preferred embodiment (which is approximately 1½ inches from front to back).

Rip fence 32 is frequently attached to the saw table 22 so that a workpiece may be abutted against the rip fence to assure that a cut which is made will be at the proper desired angle. For example, a 90 degree cross cut can be made almost exactly square by laying the workpiece against the rip fence 32 with the grain of the wood perpendicular to the saw blade and the saw blade perpendicular to the rip fence. Similarly, by appropriately adjusting the angle of the arm in relation to the workpiece, various other angular cuts may be made with ease and precision.

The present invention is useful in enhancing the likelihood of precision in making such cuts as well as simplifying the task by allowing for the removal of a bulk of the sawdust from the work area. Those skilled in the art will know that one of the problems associated with use of a radial arm saw is that the direction of rotation of blade 12 (as indicated by the arrow on the blade) as well as its location above the workpiece causes an accumulation of sawdust in the vicinity of the rip fence 32 when the rip fence is abutting the main table or a conventional accessory table or spacer on the front side. An accumulation of dust in this area may prevent the workpiece from squarely abutting the rip fence thereby causing a potential inaccuracy in the cut.

The present invention alleviates this problem by providing a plurality of apertures adjacent the front of the rip fence which allow sawdust to drop harmlessly downward to the floor and out of the way. This has the further advantage of largely freeing the user of such a saw from the burden of constantly having to sweep or wipe sawdust from the work surface. The apertures are made large enough to allow substantially all normal sizes of sawdust to drop harmlessly to the floor while allowing adequate support for the workpiece. The exact sizes of the apertures may be varied according to the desired workpiece size and/or type of blade being used. It will also be apparent that the exact configuration and shape of the apertures may be varied without departing from the spirit of the invention.

Figure 2:
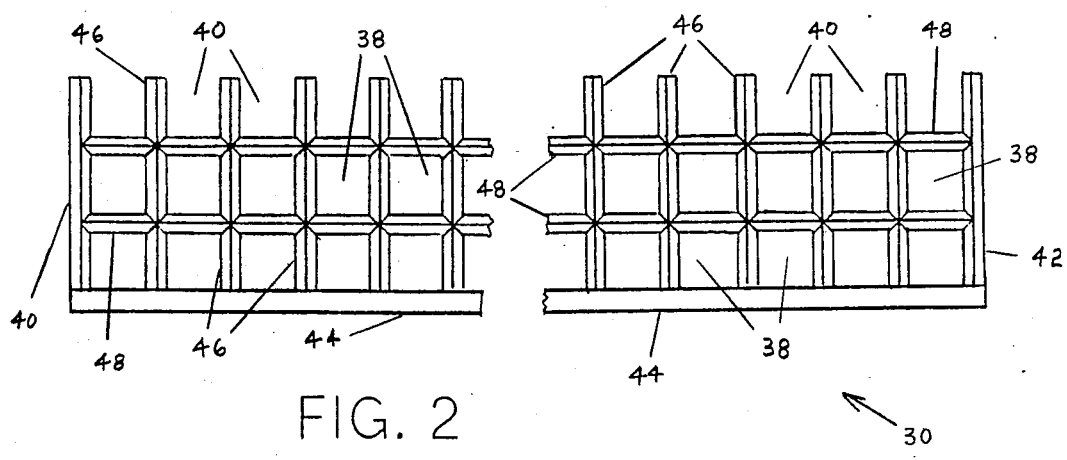
FIG. 2 is an overhead view of the accessory table of the present invention.
Figure 3:
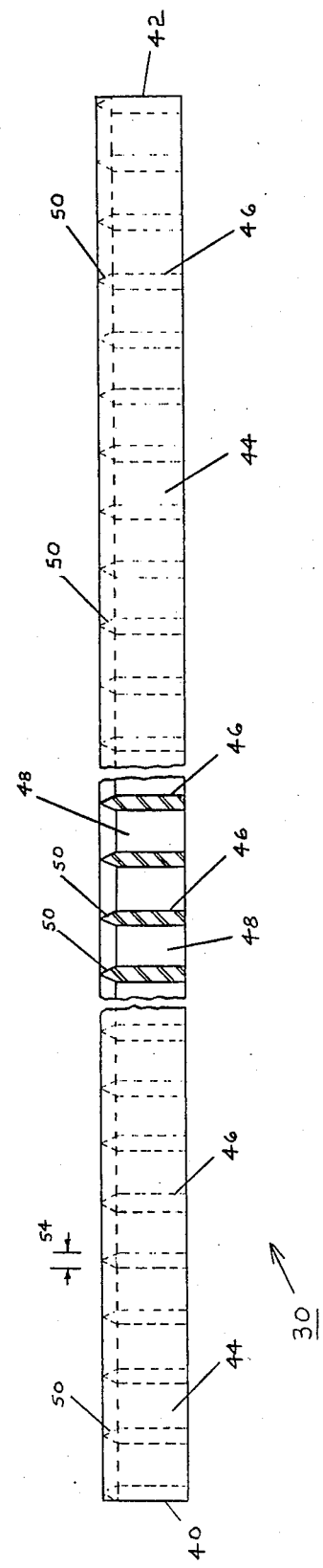
FIG. 3 is a side view of the present invention with a cutaway section.

The accessory table 30 of the present invention may be better understood with reference to FIGS. 2 and 3 which show top and side cutaway views respectively. In the preferred configuration of the present invention, approximately square apertures 38 are used as shown in FIG. 2. The apertures allow for free communication from the accessory table's upper surface to its lower surface allowing sawdust to freely pass therethrough to the floor. In addition, the rearmost apertures 40 are left unbounded on the rearmost edge until abutted against the rip fence. In this manner, the rip fence itself provides the rearmost boundary for apertures 40 allowing minimal surface area on the upper surface of the accessory table in the area adjacent the rip fence where accumulation of sawdust is most harmful to accuracy of cuts. The use of accessory table 30 may also facilitate removal of sawdust from main table 26 by allowing sawdust to be removed by sweeping, pushing or blowing any accumulated sawdust toward the accessory fence so that it will fall to the floor.

On the other three edges of the accessory table 30, a fully closed secure border is provided including side edge members 40 and 42 and front edge member 44 in the preferred embodiment. These edge members enhance the rigidity of the accessory table and lessen the likelihood of damage to it when installing the accessory table to the saw's main table 26. The accessory table 30 further includes a lattice-like structure of supporting members including front-to-back supporting members 46 and side-to-side supporting members 48.

Turning now to FIG. 3 in particular, a front view of the accessory table 30 of the present invention is shown. In this view a further feature of the invention is shown, namely that the upper (table top) edges 50 of supporting members 46 and 48 are tapered to a narrow point similar in shape to that of a chisel tip. This provides for a very small actual upper surface area so that a minimal amount of sawdust is accumulated on the upper surface in use. By providing a relatively tight lattice of such tapered structures, adequate support for the workpiece may be achieved while allowing the vast majority of sawdust to drop to the floor out of the way. By tapering the upper edges of the supporting members to a narrow point, the upper surface area is minimized.

In the preferred embodiment, accessory table 30 may be made of a readily sawable plastic. Since the saw blade of a radial saw frequently touches and saws slightly into the upper surface of the table, it is desirable for the accessory table to be sawable without being so soft as to deform when sawed but this is not to be limiting. Similarly, it is also desirable that it be made of a material which is not prone to shattering under such conditions. Those skilled in the art will also appreciate that the accessory table may be made of pressboard-like materials and other appropriate substitutes for the preferred plastic.

As previously mentioned, the present invention may take on various shapes, sizes and configurations as may be appropriate for various workpieces. As long as sawdust may readily drop out of the way of the table and fence while providing adequate workpiece support, the table make on any of a number of configurations. For general purpose work, it is anticipated that apertures approximately ½ inch (2.54 cm=1.0 inch) at each side as measured from the lower side of the accessory table will provide adequate relief from sawdust accumulation. The tapered portions of the supporting members preferably extend downward approximately ⅛ inch but this is again not to be limiting. The length from front to back may be approximately 1½ inches and the width should be appropriate to match the width of the main table (frequently 48 inches). The largest portion of supporting members 46 and 48 shown as distance 54 of FIG. 3 may be approximately ⅛ inch.

The upper edge of front edge member 44 may advantageously be left flat on its upper surface so that it may be readily determined by feeling the top surface adjacent the main table if the accessory table is correctly positioned and level with the table top of main table 26. The thickness (top to bottom) of the accessory table is preferably the same thickness as the front and rear tables so that tipping or binding will not occur when the workpiece is being sawed.

At the upper surface of the accessory table, the apertures are approximately square in the preferred embodiment. The sides of the square are approximately ½ inch in length resulting in approximately 0.25 inches square of surface area at the upper surface of the accessory table occupied by each aperture. At the lower surface of the accessory table, each square aperture is narrower so that the square is approximately ⅜ inch at each side resulting in approximately 0.14 inches of surface area occupied by each aperture in the preferred embodiment. This narrowing of each aperture results in a funnel effect which prevents sawdust from building up on the upper surface. It will be understood that the above dimensions and shapes are only illustrative and that slight variation in these dimensions occur at the rearmost array of apertures since the rip fence is preferably not tapered yet forms a border for the rearmost array.

Thus, it is apparent that in accordance with the present invention, a method and apparatus that fully satisfies the aims, advantages and objectives is set forth above. While the invention has been described in conjunction with specific embodiments, it is evident that many alterations, variations and modifications will become apparent to those skilled in the art in light of the foregoing description. Accordingly, it is intended that the present invention embrace all such alternatives, modifications and variations as fall within the spirit and broad scope of the appended claims.

What is claimed as new and desired to be secured by Letters Patent of the United States is:

1. An improved radial saw, comprising:
   a radially arm supported circular saw slidably engaged to said radial arm;
   a main sawing table and a rip fence situated below said saw;
   means for securing a removable accessory table between said main sawing table and said rip fence;
   said accessory table including a plurality of apertures appropriately dimensioned to allow most sawdust to freely drop through;
   said accessory table including a plurality of supporting members arranged in a grid-like lattice and forming said plurality of apertures, said supporting members being tapered adjacent upper surfaces thereof so that the upper surface area is minimized thereby allowing sawdust to readily drop through said apertures; and
   said rip fence being secured adjacent said accessory table so that sawdust is substantially inhibited from accumulating adjacent said rip fence.

2. The radial saw of claim 1, wherein said grid-like lattice members are arranged to provide approximately square apertures.

3. The radial saw of claim 2, wherein said accessory table is made substantially of plastic.

4. The radial saw of claim 1, wherein said grid-like lattice supporting members are arranged so that one edge of a plurality of said apertures is bordered by said rip fence.

5. A radial arm saw comprising:
   a main table and a rip fence;
   an accessory table member situated between said main table and said rip fence and having an upper and a lower surface, said accessory table member comprising a grid structure having a plurality of apertures allowing communication from said upper to said lower surface, said apertures situated between an array of rigid supporting members;
   said rigid supporting members being tapered in shape adjacent said upper surface so that minimal surface area of said upper surface is occupied by said supporting members;
   said apertures being adequately large to permit easy passage of sawdust therethrough; and
   said supporting members making up an adequately small portion of the upper surface of said table member so that accumulation of sawdust on said upper surface is minimized.

6. The apparatus of claim 5, wherein said rigid supporting members are made of a material which may be readily sawed without shattering.

7. The apparatus of claim 6, wherein said rigid supporting members are made of plastic.

8. The apparatus of claim 5, wherein said apertures are approximately 0.25 inches square in area at said upper surface.

9. The apparatus of claim 8, wherein said apertures are approximately 0.14 inches square in area at said lower surface.

10. The apparatus of claim 5, wherein said rip fence forms a border of said table member, and wherein said plurality of said supporting members abut said rip fence at predetermined intervals allowing free passage of sawdust between said rigid supporting members adjacent said rip fence, whereby, relatively minimal contact between said rip fence and said accessory table member is achieved permitting ready passage of sawdust through said apertures.

11. A radial arm saw, a main table and a rip fence comprising in combination:
   a table member mounted between said main table and said rip fence, distinct and removable from said main table, having an upper and a lower surface, said table member comprising a grid structure having a plurality of apertures allowing communication from said upper to said lower surface, said apertures situated between an array of rigid supporting members made of a material which may be readily sawed without shattering;
   said supporting members forming a border adjacent said fence and abutting said fence at predetermined intervals to minimize upper surface area immediately adjacent said fence;
   said apertures being adequately large to permit easy passage of sawdust therethrough; and
   said rigid supporting members being tapered in shape adjacent said upper surface so that minimal surface area is occupied at said upper surface and passage of sawdust through said apertures is facilitated.

* * * * *